April 13, 1937. C. CAMPBELL 2,076,703
RECORD CARD CONTROLLED STATISTICAL MACHINE
Filed Dec. 19, 1928   4 Sheets-Sheet 1
FIG.I.
FIG.2.
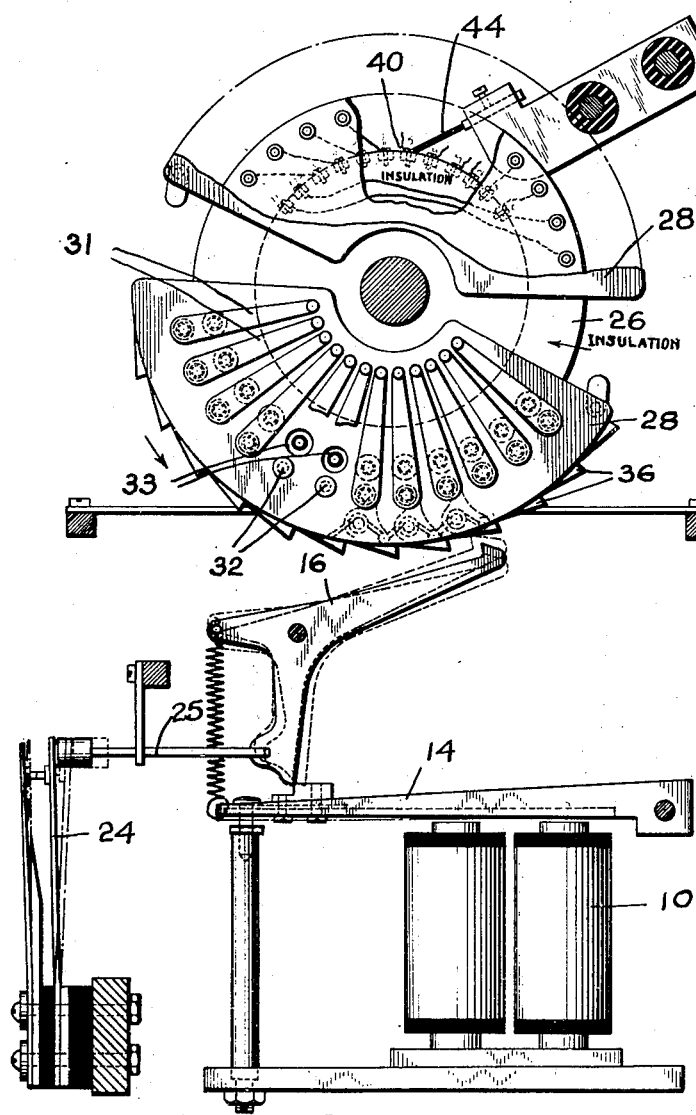
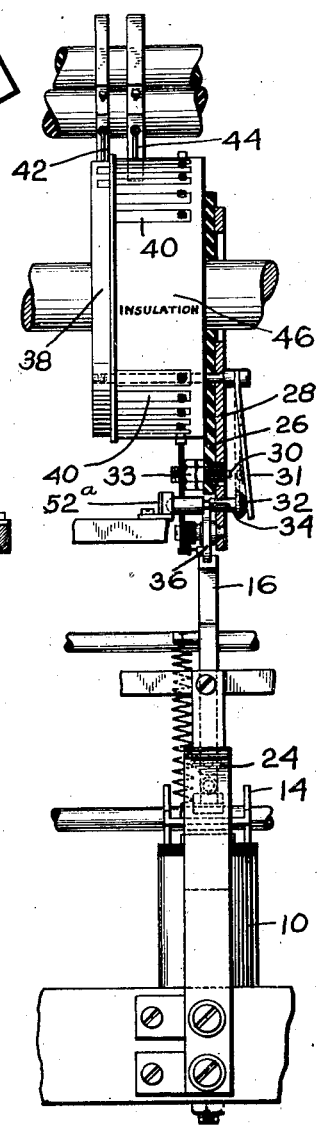
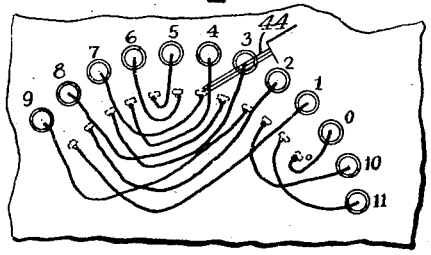
FIG.1a.
Inventor
Charles Campbell
By his Attorney April 13, 1937.  C. CAMPBELL  2,076,703
RECORD CARD CONTROLLED STATISTICAL MACHINE
Filed Dec. 19, 1928   4 Sheets-Sheet 2
FIG.3.
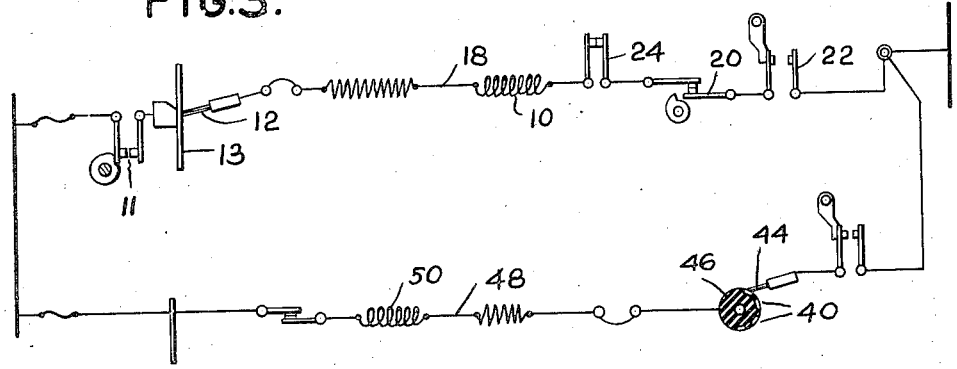
FIG.4.
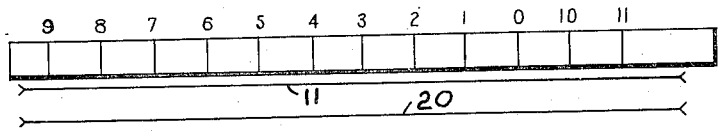
FIG.7.
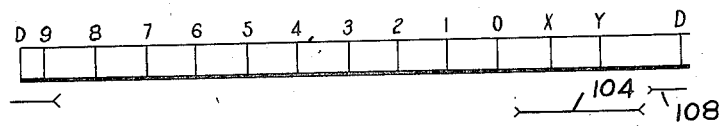
FIG.5.
Inventor
Charles Campbell
By his Attorney
W. M. Wilson April 13, 1937. C. CAMPBELL 2,076,703
RECORD CARD CONTROLLED STATISTICAL MACHINE
Filed Dec. 19, 1928 4 Sheets-Sheet 3

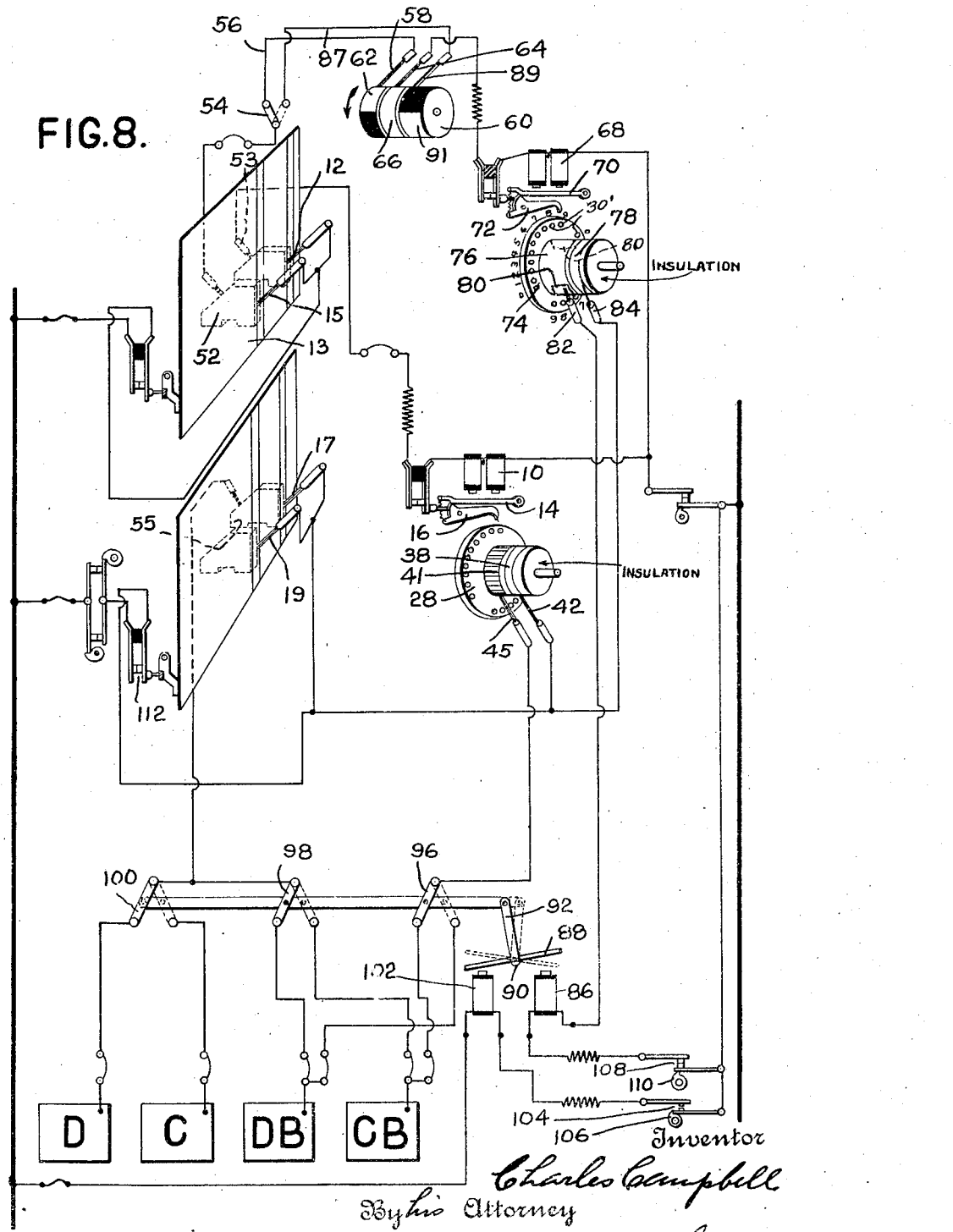

Patented Apr. 13, 1937

2,076,703

UNITED STATES PATENT OFFICE 2,076,703

RECORD CARD CONTROLLED STATISTICAL MACHINE

Charles Campbell, London, England, assignor, by mesne assignments, to International Business Machines Corporation, New York, N. Y., a corporation of New York Application December 19, 1928, Serial No. 327,037
In Great Britain December 31, 1926

9 Claims. (Cl. 235—61.8)

This invention relates to record-card-controlled statistical machines of the kind in which the operation of the registering or recording device depends upon the time in its cycle of operations at which an operating impulse is transmitted thereto, the said time being determined by the positions of holes in the record card.

This application is a division of the application of Charles Campbell, filed December 6, 1927 and identified by Serial No. 238,011 (now Patent No. 1,987,322, dated January 8, 1935).

Normally the time of the impulse in relation to the travel of the card is the same as the time in relation to the cycle of operations of the registering or recording device; for example, if a hole occurs in the sixth position in a column of ten hole positions on a moving card, then the impulse occurs at the sixth of ten successive stages in the cycle of operations of the registering or recording device.

In certain cases the succession of values assigned to hole positions on the card does not agree with the succession of stages in the cycle of operations of the aforesaid device. Such lack of agreement occurs when it is desired to represent amounts in the duodecimal system for example pence) on record cards primarily designed for the decimal system. On the well-known Hollerith card the "leading" hole position (that which reaches the reading brush first) is assigned the value 9, the remainder being in reversed numerical order ending with 0. On the part of the card preceding the 9 position there is insufficient room for the two additional hole positions needed to represent 11 and 10. It is impracticable to reduce the spacing of the hole positions in a column to make room for the extra two, and if they are placed at the other end of the column; not only will the order of the hole positions be incorrect (they will pass the reading brush in the order 9, 8, 7.—.1, 0, 10, 11) but the time taken for them to pass the reading brush is longer than the operative cycle of the registering or recording devices.

One part of the present invention accordingly comprises a device designed to receive an impulse from a record card at a moment determined only by the position of a hole in the record card and to emit an impulse at a moment in another similar sequence which differs from the first mentioned sequence in the length of its time intervals, for example these intervals are uniformly shortened. In the example referred to, the sequence on the card is 9, 8, 7.—.1, 0, 10, 11 and the time intervals are those suited to the decimal system, namely one-tenth of the operative cycle of the registering or recording device; the sequence in which it is desired to emit the impulse must be in the order 11, 10, 9, 8, 7.—.1, 0 and the time intervals must be one-twelfth of the operative cycle of the registering or recording device.

The "emitting" sequence is preferably timed to occur one whole card cycle later than the "receiving" sequence.

It is an object of the present invention to improve devices of this character, and in particular to enable the amounts represented by holes in the cards to be read as direct amounts and complements simultaneously, and further to enable the capacity of the record cards to be increased.

Accordingly this part of the present invention comprises a translating device of a dual character one part of which gives indications which are complementary to those given by the other part.

Preferably the translating device is an electrical device and comprises two sets of contact blocks one arranged as heretofore in the direct order and the other arranged in the reverse order to give indications complementary to those given by the first.

It is preferred to employ two commutators each having a set of segments wired to the switches in such a manner that one set of the commutator segments is in a direct sequence and the other in a reverse sequence, that is when a decimal system is used, the first to the tenth, the second to the ninth and so on. Thereby one card controlled mechanical operation (or plurality of operations) suffices for obtaining direct and complementary readings simultaneously. The brushes associated with the complementary and direct commutators may be selectively associated with totalizers so that either positive or negative amounts may be entered therein as direct numbers and complements as required.

The above and other features of the invention will appear from a consideration of the following description of preferred embodiments thereof, taken in conjunction with the accompanying drawings, in which:

Fig. 1 is an end elevation of an impulse changeing device, part being broken away for clearness;

Fig. 1a is a diagram of wiring connections;

Fig. 2 is a side elevation of Fig. 1;

Fig. 3 is a circuit diagram;

Fig. 4 is a timing diagram;

Fig. 5 is an illustration of a Hollerith card;

Fig. 7 is a diagram showing the timing of certain parts of Fig. 6; and

Fig. 8 is a view similar to Fig. 6 of an alternative construction.

Figure 6:
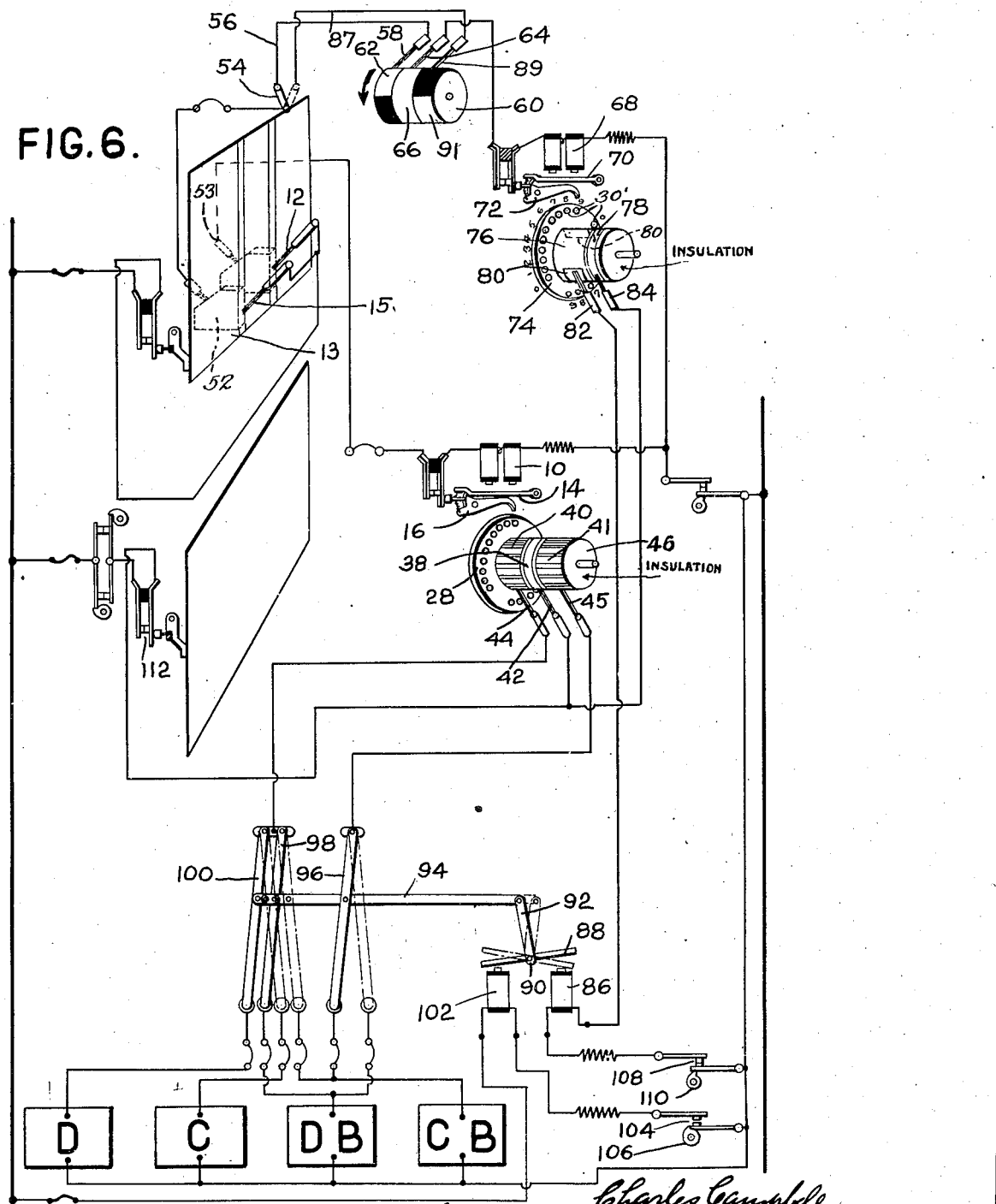
Fig. 6 is a diagrammatic illustration of a machine embodying the device of Figs. 1 and 2.

In Figs. 1, 2, 3 and 4 there is illustrated a device, applicable to a statistical machine of the well-known electric type employing Hollerith cards and Hollerith counters, which enables two additional hole positions to be employed in a column on the card, in order to represent pence.

As is well known, the decimal hole positions on the Hollerith card (Fig. 5) pass the reading brushes in the order 9, 8, 7.–.–.1, 0. The operative or adding part of the cycle of the counter wheels is performed in the time taken for the card to travel from 9 to 0. The remainder of this cycle is not available for registering operations. The hole positions on the record card are so located that there is no room for the two extra hole positions preceding the "9" position, and they must be placed at the head of the column, in their wrong numerical order. It is not desirable for practical reasons to change the values assigned to the ten existing hole positions nor to change the spacing of the holes, which would enable the twelve hole positions to be placed in their correct order in the column and within the space of ten decimal hole positions. The mechanism now to be described virtually accomplishes these changes.

An electromagnet 10 is placed in the circuit of the card reading brush 12 (Fig. 3) which reads a twelve-hole column on the card 13. Its armature 14 constitutes a latch for a spring-pressed trip lever 16. When a hole in a card passes the reading brush the electromagnet is energized and the trip lever is unlatched. This is the only operation directly performed by the card reading circuit. This circuit 18 (Fig. 3) also includes the usual cam contacts 20 and card lever contacts 22 and also a pair of contacts 24 (see also Fig. 1) normally held closed by a rod 25 connected to the trip lever 16 and arranged to open when the trip lever is released by the armature 14, thereby interrupting the circuit and preventing sparking at the brushes.

A disc 26 of insulating material carries two sector shaped metal plates 28 and is mounted to rotate with the edges of the plates 28 in proximity to the hooked end of the trip lever 16, and is geared to the card feeding mechanism (not shown) in such a manner that it makes one revolution for two complete card cycles. Each plate 28 carries a series of twelve spring closed switches 30 each of which is held open by a plunger 32 having a groove 34 in which engages one end of a pivoted trip pawl 36 the other end of which projects from the edge of the disc so as to miss the hooked end of the trip lever when the latter is in the latched position but to engage it when it is unlatched as aforesaid.

The springs 31 carrying the movable contacts of the switches are all electrically connected to the plate 28 which carries them, and the fixed contacts 33 are all insulated from the plates.

When one of the trip pawls is engaged by the trip lever it is rotated slightly, thus releasing the plunger 32 and allowing the corresponding switch 30 to close. Continued rotation of the disc causes the trip pawl to snap past the hooked end of the trip lever and in so doing to relatch it with the armature 14, the energization of which is only momentary. This movement also recloses the momentarily opened contacts 24, as will be readily apparent.

The twelve trip pawls are so situated on the disc that each is approaching the end of the trip lever when the corresponding hole position on the card is at the reading brush. Consequently if there is a hole in the card at any one of the twelve positions representing 9, 8, 7.–.–.1, 0, 10 and 11 pence respectively, the corresponding switch will be closed. Both plates 28, to which the movable spring 31 of the switches are connected, are themselves connected to a slip ring 38 fixed to the disc.

The fixed contacts 33 of each set of twelve switches are connected singly to twelve commutator segments 40 carried by the disc 26, the first switch (in relation to the direction of rotation) being connected to the third segment, the second to the fourth and so on, but the eleventh and twelfth switches are connected respectively to the second and first.

The trip pawls 36 are spaced apart in such a manner that they all pass a fixed point in the time taken for the twelve hole positions to pass the reading brush, but the segments 40 are placed closer together so that they pass a given point in the time taken for the normal ten hole positions to pass the reading brush.

It will be appreciated that owing to the order in which the switches are connected to the segments, the latter will pass a fixed point in the order 11, 10, 9, 8.–.–.1, 0, and that owing to their closer spacing they will pass in the time occupied by the "adding" part of the cycle of a Hollerith counter.

A fixed brush 42 bears upon the slip ring aforesaid and a similar brush 44 upon the segments which are let into a suitable body 46 of insulating material so as to be flush with its surface, and these two brushes are placed in the operating circuit 48 (Fig. 3) of a Hollerith counter 50 adapted for the duodecimal system. It will be clear that when a switch 30 has been closed by the presence of a hole in the card (say the 5 hole in the sequence 9, 8, 7.–.–.1, 0, 10, 11) the operating circuit will be closed when the segment connected to that switch makes contact with its brush, with the result that a current impulse will be sent to the counter at a time corresponding to the 5 position in the sequence 11, 10, 9.–.–.1, 0.

The fixed brush 44 bearing upon the segments is placed in such a position that the first segment (in relation to the direction of rotation) of one series reaches it at the moment when the first trip pawl of the other series is approaching the trip lever as will be clear from Fig. 1 if disk 26 is so positioned, or placed at its normal position. The effect of this is that the reading-out of a card designation is performed one card cycle after the reading-in operation of the same designation and during the reading-in of the designation of the succeeding card. Thus the cards may follow one another past the reading brushes with the normal narrow space between them.

The switch 30 which has been closed is re-opened and re-engaged with its trip pawl by means of a fixed cam surface 52a (Fig. 2) which engages the rounded end of the plunger 32 and pushes it in a direction to open the switch and to bring the groove in the plunger into register with the spring-pressed trip pawl. This cam surface is situated just in advance of the trip lever.

The cam contacts 20, and a further pair of cam contacts 11 in the common lead to the contact block with which the brushes 12 cooperate, are closed just before the "9" position reaches the brushes and are opened just after the "11" position has passed the brushes, as shown in Fig. 4.

If direct numbers and complements of decimal amounts are to be read at the same time, there are two sets of segments 40 and 41 the latter as shown in Fig. 6 being carried by an extension of the body 46 shown in Fig. 2, and one wired directly (first to first etc.), and the other wired reversely (first to tenth etc.) and two pairs of brushes connected to two different counters. If there are two distinct sets of card reading brushes one above the other, one card cycle apart, only a single reversely wired set of ten segments is required in each set as will be more particularly described in connection with Fig. 8. In this case the card is read twice, the reading by the upper brushes being given out as a complement one cycle later, and the reading by the lower brushes being made effective directly, synchronously with the delayed first reading.

In the case of duodecimal amounts two sets of twelve segments must be used, if it is desired to obtain both direct and complementary readings, one wired in the manner first described and the other as in Fig. 1a which shows the wiring connections from the switches to the second set of segments for entering complements of duodecimal amounts.

When the two readings, direct and complementary are both taken, whether they are decimal or duodecimal amounts, the direct amounts are entered on a "direct" counter and the complementary amounts on a "complementary" counter. A switch may be employed for reversing these connections if desired, and this switch may be operated by an electromagnet under the control of a special hole in one column of the card. If this hole is present, the amount represented in the column which is adjacent the column in which the special hole is provided is to be taken as a negative amount, and its complement therefore must be entered into the "direct" counter and the direct amount into the "complementary" counter. The switch aforesaid is arranged accordingly.

A machine will now be described with reference to the diagram Fig. 6, which will enable these results to be obtained.

Referring again to Figure 5, column No. 20 is set apart for a hole indicating whether the amounts in columns Nos. 21–25 are positive or negative. With the switch 54 in a certain position a hole in column No. 20 in any one of the hole positions 4 to 0 or one in the hole positions 9–5 of one type of card signifies that the amounts are negative or positive, respectively, while with the switch 54 shifted, if there is a hole in positions 4–0 or one in any one of the hole-positions 9 to 5 the amounts are positive or negative, respectively.

Positive amounts are to be added as direct numbers on a counter C (credit) and added on a balance counter CB (credit balance) and their complements are to be entered on a balance counter DB which of course results in the amount being subtracted from the sum already registered thereby.

Negative amounts are to be added as direct numbers on a counter D (debit) and added on the balance counter DB, while their complements are to be entered into the balance counter CB, thus subtracting the amount from the credit balance. The above method of operation will give a true balance of either positive or negative amounts irrespective of the relative magnitude of the positive and negative entries.

The card 13 is shown in Fig. 6 passing reading-brushes 12 for the columns Nos. 21 to 25 (only one of which is shown) and a brush 15 which reads column No. 20. The contact block 52 with which the brush 15 cooperates is connected through a switch 54, through a wire 56, to a brush 58 which rides on a current distributor 60 geared to the card feed devices (not shown) so as to make one revolution per card cycle. The contact segment 62 which is under the brush 58 is of such an angular extent that it makes contact with the brush 58 only during the time that the five hole positions 9 to 5 (positive) in column 20 are passing the brush 15. While the hole positions 4 to 0 are passing the brush 15 the brush 58 is on an insulating part of the distributor 60.

Another brush 64 bears upon a slip ring 66 electrically connected to the segment 62. The brush 64 is connected to an electromagnet 68.

It is evident that a card which has a hole in any position from 9 to 5 (indicating positive) in column No. 20 will cause the electromagnet to be energized. If there is a hole in any position from 4 to 0 (indicating negative) the magnet 68 will not be energized. Thus the magnet only responds to "positive" holes, when the switch 54 is in the position shown. The operations which occur when the switch 54 is moved will be referred to later.

The magnet 68 operates an armature 70 which unlatches a trip lever 72 similar to the trip lever 16, Fig. 1, previously described. This trip lever engages one or other of five trip pawls corresponding to holes 9–5 carried by one-half of a rotating disc 74 and operates one of these five switches 30' (there are of course two sets of five switches for each half of disk 74) similar in construction to the switches 30 previously described. The disc 74 also carries a commutator 76 and a slip ring 78 and is in all respects like the device described with reference to Figs. 1 and 2 except that it carries two sets of ten switches each, instead of two sets of twelve switches each and aside from other obvious changes its commutator has only one pair of segments 80, to each of which all the ten switches 30' of one set are connected.

Two brushes 82 and 84 cooperate with the commutator 76 and slip ring 78, to close a circuit of an electromagnet 86 through one of the closed switches 30' and which electromagnet has an armature 88 pivoted at 90 and having fixed thereto an arm 92 to the end of which is connected a link 94 itself conneted to three pivoted switch arms 96, 98, 100. The armature 88 is extended beyond its pivot and there cooperates with a further magnet 102 energized through contacts 104 closed by a cam 106 for a short period after the passage of the last hole position of each card, as indicated in Fig. 7.

A pair of contacts 108 is placed in the circuit of the magnet 86, and they are closed by a cam 110 immediately after the contacts 104 open (see Fig. 7) and opened just after the passage of the "9" position of the next card. The segment 80 previously referred to is under the brush 82 during the time that the contacts 108 are closed.

It will be evident that if the magnet 86 is momentarily energized, consequent on there being a hole in one of the positions 9 to 5, the switch arms 96, 98, 100 will be pulled into the dotted line positions when contacts 108 close and the brush 82 engages one of the segments 80 and will stay in those positions during the passage of the numeral hole positions of the next card past the brushes 12, and after the last hole position has passed, the magnet 102 will be momentarily energized thereby returning the switch arms to the full line positions. If there is no hole in the 9 to 5 positions (indicating positive) of column No. 20, the switch arms will not be moved.

Each of the contact blocks 53 cooperating with the brushes 12 is connected to the electromagnet 10 of a device, only diagrammatically shown in Fig. 6, which is similar to that described with reference to Figs. 1 and 2. Since in the present case only decimal numbers are being dealt with (it would equally be possible to deal with twelve hole positions, however) there are only ten trip pawls in each set and only ten commutator segments 40 wired to the switches 30 in direct sequence. In addition there is another set of segments 41 wired in reversed sequence, that is the first to the tenth, the second to the ninth and so on.

The brush 44 which bears upon the segments 40 is connected to the switch arms 98 and 100, and the brush 45 bearing upon the segments 41 is connected to the switch arm 96. The brush 42 bearing upon the slip ring 38 is connected to the source of current through card lever contacts 112 which are closed by the cards one cycle later than the reading of the holes of the same card by the brushes 12 and 15 at which time the sets of segments 40 or 41 are emitting a direct number and complement.

It will be seen from the drawings (Fig. 6) that when the switch arms 96, 98, 100 are in the full line positions they connect the brush 44 to the counters D and DB, while the brush 45 is connected to the counter CB. Thus negative amounts are entered into the counters D and DB as direct numbers and into the counter CB as complements, as was required.

When the switch arms are in the dotted line positions (as they are when a "positive" card has been read) due to the energization of magnet 86 by a closing of one of the switches 30' they connect the brush 44 to the counters C and CB, and the brush 45 to the counter DB. Thus positive amounts are entered into the counters C and CB as direct numbers and into the counter DB as complements, also as was required.

The brush 45 which reads the "complementary" commutator segments 41 for the units denomination may be displaced in relation to those for the other denominations which are in the normal reading position in order to enter an amount which is the complement with respect to ten of the number represented by a hole in the card in the units column. With the arrangement disclosed in Fig. 6, if a card is presented to the brushes 12 and 15, the former will read out the amount representing perforations to thereby transmit electrical impulses to the magnet 10 so that segments 40 are selected to transmit during the next cycle of operation, impulses representing the direct number and, segments 41 selected for transmitting impulses representing the complement of such numbers. If such a card has no perforation in index positions 5 to 9 of column 20 none of the switches 30' will be closed so that at the termination of the first cycle of operation there will be no circuit connection to magnet 86 when contacts 108 close. Therefore, switches 100 and 96 will remain in the position shown in Fig. 6. During the second cycle of operation, a direct number will be entered under control of brush 44 to the counter D and counter DB and a complement will be transmitted by brush 45 to the counter CB. During the cycle of operation in which amounts are entered as just described, brushes 12 and 15 are analyzing the second card. Brushes 12 thereupon control the setting of certain switches so that by segments 40 and 41 a direct number and a complement of the amount representation on the second card will be entered in the appropriate counter during the third cycle of operation. During the second cycle of operation, if a card happens to be perforated in the five to nine index point positions of column 20, one of the switches 30' will be closed. At the termination of the second cycle of operation as contacts 108 close a circuit connection will be made to magnet 86 through brush 82, segment 80, one of the closed switches 30', ring 78, brush 84 and card lever contacts 112 which are now closed. Thereupon switches 96 and 100 will be shifted to the dotted line position shown in Fig. 6 whereupon during the third cycle of operation, a direct number will be entered in the counter C and in the balance counter CB and the complement entered under control of brush 45 to the balance counter DB. After the entry operation, contacts 104 are closed to thereby energize magnet 102 to bring switches 100 and 96 to their normal positions (shown in full lines in Fig. 6), and the switches are subsequently shifted if the magnet is thereafter energized due to the closure of a switch 30' secured during the previous cycle of operation.

Fig. 8 shows an alternative construction wherein a single set of commutator segments 41 is employed, reversely connected to give complements, and a second set of reading brushes 17, 19 is arranged to read the holes in the cards exactly one card cycle later than the brushes 12, 15 to enter direct numbers. As in the construction of Fig. 6, the brush 45 is connected to the switch arm 96, which enters the complementary amounts into the balance counter DB or CB according as the magnet 86 is or is not energized.

The contact block 55 cooperating with the brush 17 (which reads one of the amount columns 21 to 25) is connected to the switch arms 98 and 100, in order to enter the direct amounts into the counters C and CB, or D and DB according as these amounts are positive or negative.

The brushes 17, 19 are connected to the brush 84 and are supplied with current through the card contacts 112.

With respect to the arrangement disclosed in Fig. 8, it will be observed that the manner in which the counters are selected for the entry of direct numbers and complements is precisely the same as is accomplished by the arrangement disclosed in Fig. 6. However, it should be observed that since a single set of reversely wired segments 41 are employed the upper amount reading brushes 12 set up the switches of the commutator so that upon a subsequent cycle of operation the complements will be read out. The entry of direct numbers is effected by the second analyzing of the perforations by brush 17. The entry of direct numbers is therefore obtained during a second cycle of operation and under control of card perforations thus eliminating the direct reading segments 40 of the commutator disclosed in Fig. 6.

The arrangement in Fig. 8 has the disadvantage however that it cannot be employed for the entry of duodecimal amounts because while complements may be emitted by the reversely wired segments 41 which can be spaced to coincide with the ten point spacing of the wheels of the counter which are standardized, the impulses transmitted under control of reading brushes 17 will be according to the spaces of the twelve holes of the card. This spacing is, of course, greater than the ten hole spacing and the counter wheels could not be properly actuated as it would be necessary to operate them at one time under control of a certain time spacing and again, at another time, under control of a different time spacing.

It is apparent that the two constructions may be employed together in the same machine in those cases where some of the amount columns are decimal and one (or more) is a twelve-hole column, the brush 17 for the twelve-hole column being of course idle in so far as the mechanism dealt with herein is concerned.

In both constructions there is a set of switch arms 96, 98, 100 for each denomination of the card field being dealt with, and they are operated together by a single pair of magnets 86, 102.

The purpose of the switch 54 may now be explained. When moved to its other position it connects the block 52 to a wire 87 leading to a brush 89 which bears upon a conducting segment 91 so arranged as to be under the brush 89 when the hole positions 4 to 0 on the card are passing the brush 15 and the switches corresponding to holes 4-0 pass trip lever 72. When the switch is in this position the magnet 68 will be energized only if a hole occurs in one of the positions 4 to 0. Thus the credit amounts will be treated as negative and the debit amounts as positive. The possibility of thus reversing the sign of the credit and debit amounts is useful in certain cases, particularly where there is only one balance counter available.

It will be obvious from Fig. 6 that if it is known in advance that the credit items will, in numerical value, exceed the value of the debit items, a single balance counter CB may be used to secure the balance, in the event that the other balance counter DB is otherwise employed. The operation is as described previously in connection with either Fig. 6 or Fig. 8, the operator shifting switch 54 to the full line shown in Fig. 6 or 8. When the balance counter DB is employed for other purposes and it is known in advance that the debit items exceed the credit items the balance may be derived upon the balance counter CB. In such instance, the sign reversing switch 54 is shifted to the dotted line position whereby debit items as direct numbers are entered in the counter CB and credit items entered in the balance counter CB as complements, and complementary entries transmitted by segments 41 are diverted for entry in counter CB by the perforations at the positions 0 to 4 instead of by the perforations at the 5 to 9 positions.

What is claimed is as follows:

1. In a record controlled machine, record analyzing mechanism, a translator device comprising means controlled by the analyzing mechanism for receiving operating impulses singly whose values are determined by their time spacing, and means controlled by said first named means for emitting two operating impulses for each one received, said emitted impulses having values determined by a different time spacing with respect to the original time spacing and one of said emitted impulses corresponding to the direct value of a received impulse and the other to its complementary value.

2. In a record controlled machine, record analyzing mechanism, a translating device comprising means controlled by the analyzing mechanism for receiving operating impulses whose values are determined by their time spacing and serial order and means controlled by said first named means for emitting two operating impulses for each one received, said emitted impulses having values determined by a different time spacing with respect to the original time spacing and a different serial order and one of said emitted impulses corresponding to the direct value of a received impulse and the other to its complementary value.

3. In a record controlled machine, a plurality of accumulators, means under control of an analyzing element for determining the presence of a perforation in one of several possible positions of a single card column for selecting the appropriate accumulators for the entry of direct numbers and complements, means under control of the value representing perforations of the card to directly enter the direct number, and translating means to enter the complement during the cycle of operation subsequent to the cycle in which the card is analyzed for accumulator selection and for value representing perforations.

4. A record controlled machine comprising, analyzing mechanism for records of the single hole type and entry receiving mechanism, said mechanisms having distinct operating cycles and each of different duration, and a translator mechanism comprising a plurality of sets of electrical contacts controlled by the analyzing mechanism, one set settable alone to represent a reading of a related hole of a controlling record and at a time according to the point in the analyzing cycle the hole is analyzed, commutator segments, and electrical connections between said electrical contacts and segments for converting the received readings into their complementary values and for concurrently respacing them according to the duration of the entering cycle for entry into the entry receiving mechanism.

5. A record controlled machine comprising, analyzing mechanism for records of the single hole type, entry receiving mechanism, said mechanisms having operating cycles of different duration, a member carrying a plurality of devices controlled by the analyzing mechanism each for receiving readings from controlling records and settable according to the point in the analyzing cycle the hole is analyzed, means for rotating said member in synchronous relationship with the analyzing of the record to bring said devices successively under control of the analyzing means, means for converting the readings received into their complementary values by the transposition of the serial order of each reading, and means for respacing the complementary values to be in accord with the duration of the entering cycle for entry into the entry receiving mechanism.

6. In a record controlled machine, a member carrying a series of electrical contact devices, means for rotating said member to cause said contact devices to be placed under control of analyzing means for cards of the single hole type, segments carried by said member and having a different time spacing than said electrical contacts, electrical wiring connections for connecting said contact devices and segments in inverse order, and means including a brush electrically engaging said segments and controlling the operation of a responsive mechanism having the same time spacing as said segments.

7. In a record controlled machine, a plurality of settable electrical contact devices, means under control of cards of the single item perforation per column type for setting one of said devices alone for each card analyzing operation, a series of segments connected to said electrical contact devices in inverse order, said segments having a time spacing different than said electrical contact devices, a single brush coacting with said segments, means for relatively shifting said brush and segments, and means whereby said brush controls the operation of a responsive mechanism having the same time spacing as said segments.

8. An accounting machine comprising, a data receiving mechanism having an entry cycle of normal duration, entering means for controlling entries made within the normal entry cycle and others which occur extraneous of the normal entry cycle, and means for causing any entry from said entering means to be effected in said data receiving mechanism within the normal entry cycle and for converting entries from said entering means into complementary entries for entry in the data receiving mechanism.

9. In a record controlled machine, in combination, a single balance accumulator, means for analyzing amount representing perforations in a record, means under control of said analyzing means for normally entering the amount negatively in said balance accumulator, positive number entering means under control of said analyzing means for entering an amount positively in said balance accumulator, means for analyzing a record for the presence of a perforation in one of a number of predetermined positions in a record of one type or for the presence of a perforation in one of a number of other predetermined positions of a record of another type, devices for rendering the positive number entering means effective and the negative amount entering means ineffective, and selective means for causing said devices to be rendered effective by the last named analyzing means in response to analyzing a perforation in a record of either type.

CHARLES CAMPBELL.